Nov. 18, 1947.  F. W. GODSEY, JR  2,431,241
STALL WARNING INDICATING APPARATUS
Filed Sept. 19, 1944  2 Sheets-Sheet 1

WITNESSES:

INVENTOR
Frank W. Godsey, Jr.
ATTORNEY

Nov. 18, 1947.                F. W. GODSEY, JR                    2,431,241
                    STALL WARNING INDICATING APPARATUS
                    Filed Sept. 19, 1944           2 Sheets—Sheet 2
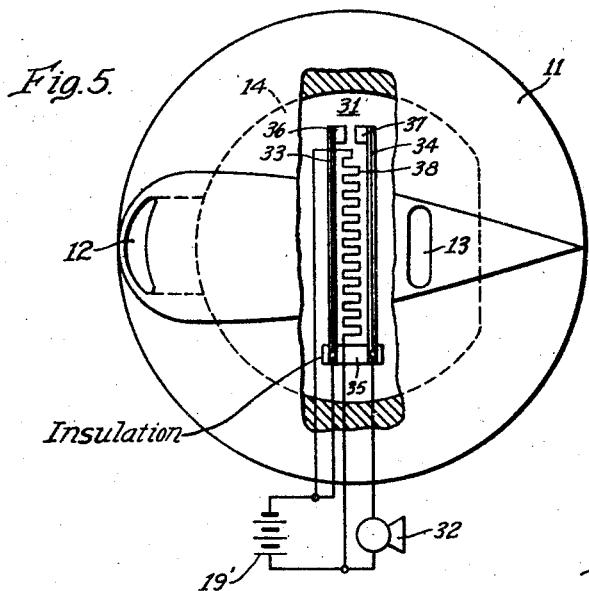
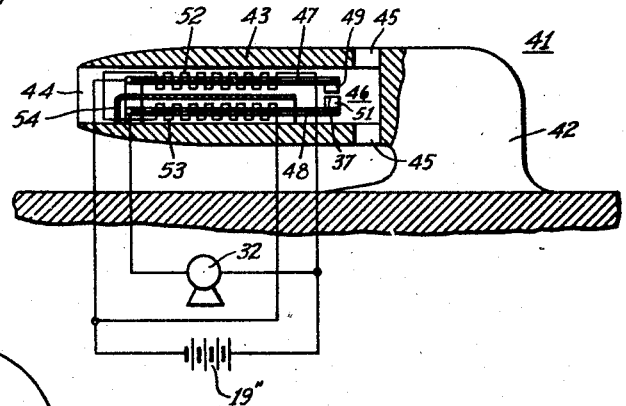
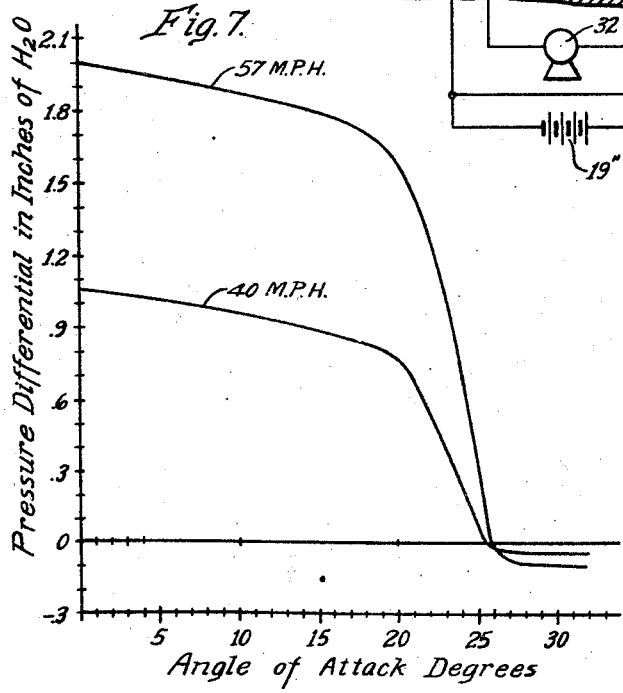
INVENTOR
*Frank W. Godsey, Jr.*
ATTORNEY Patented Nov. 18, 1947

2,431,241

UNITED STATES PATENT OFFICE 2,431,241

STALL WARNING INDICATING APPARATUS

Frank W. Godsey, Jr., Mount Lebanon, Pa., assignor to Westinghouse Electric Corporation, East Pittsburgh, Pa., a corporation of Pennsylvania Application September 19, 1944, Serial No. 554,787

15 Claims. (Cl. 177—311)

My invention relates, generally, to indicators or warning apparatus and, more particularly, to stall indicating or warning apparatus for use on airplanes to warn the pilot of an incipient stall condition.

Heretofore several types of stall warning indicating devices or systems have been tried out. While some of these devices have been found to be satisfactory from the standpoint of cost and reliability under favorable operating conditions, they are not entirely satisfactory, safe, and reliable under all operating conditions encountered. This is true particularly where icing conditions are encountered.

It is known that the fundamental cause of the stall is the disturbance of air flow over the upper surface of the wing, and that for every airfoil there is a particular angle of attack at which the stall occurs almost regardless of speed. At the particular angle of attack at which the stall occurs, the air moving over the wing no longer follows the contour thereof but becomes turbulent, particularly in the vicinity of the trailing edge of the wing. This results in the wing losing its required lift. Ice accumulation at or near the leading edge of the wing causes the angle of stall to become progressively smaller depending upon the degree of icing.

Accordingly, any stall warning device or system which triggers or responds to a definite angle of attack is not satisfactory under all operating conditions and is hazardous when used on airplanes which are subject to icing. It is, of course, possible to de-ice the wings or the device, but such is not feasible in many instances.

One example of devices responsive to a definite angle of attack regardless of changes in contour of the airfoil is the vane actuated switch mounted upon the leading edge of the wing so as to be responsive to the change or reversal of air-flow direction at the leading edge of the wing. This type of device is, of course, purely mechanical and not safe or suitable for use under conditions where icing occurs.

Another example of a device or system which triggers at a definite angle of attack is in the form of a diaphragm actuated switch positioned within the wing and actuated by a change in air pressure at an opening in the leading edge of the wing.

While ice accumulation on the wing interferes with the operation of devices of this type, it also changes the contour of the airfoil and the angle of stall which becomes smaller, and, therefore, an incipient stall condition may result before a warning is given to the pilot.

Attempts have also been made to use a device which is triggered or which responds to the initial change in the airflow characteristics on the upper surface of the wing in the vicinity of the trailing edge thereof. A device of this kind comprises a diaphragm actuated switch positioned within the wing, and having one side of the diaphragm subjected to the air pressure within the wing and the other side of the pressure determined by the air flow over the surface of the wing so as to be responsive to a pressure differential as determined by the angle of attack. While a device of this type has been found to be fairly satisfactory, it is not entirely satisfactory, particularly under icing conditions, as the warning margin varies and approaches an unsafe value in some instances.

An object of my invention, generally stated, is to provide a stall warning apparatus for use on airplanes which shall be of simple and economical construction which shall be reliable and accurate under varying operating conditions, and which shall not be materially affected by changes in ambient temperature.

A more specific object of my invention is to provide stall warning apparatus for use on airplanes which shall function in response to a change in the characteristics of the air flow over the upper surface of the wing to warn the pilot of an incipient stall condition.

Another object is to provide apparatus of the character described which shall be unaffected by the speed of the plane and which shall function to warn the pilot of an incipient stall condition regardless of the change in airfoil contour resulting from ice formation.

A further object of my invention is to provide a pressure or air-flow sensitive control element suitable for mounting upon the upper trailing edge of the wing of an airplane for controlling the operation of a stall warning indicator in the form of a visible or audible signalling device in response to a change in the characteristics of the air flow over the upper surface of the wing.

Another object of my invention is to provide stall warning apparatus for airplanes wherein the control element is responsive to heat-flow directions which are determined by the air-flow directions.

Another object of my invention is to provide a pressure or air-flow sensitive switch for use in stall warning indicating systems which utilizes bimetallic contact elements and an electric heater disposed therebetween responsive to air-flow direction for controlling the energization of a suitable alarm device.

A further object of my invention is to provide in stall warning apparatus for utilizing a plurality of hot wire anemometer elements in a bridge circuit for controlling a relay which controls the energization of a suitable alarm device.

Another object of my invention is to provide apparatus of the character described which is not affected to any appreciable degree by ambient temperature changes and changes in the voltage of the battery or other source from which it is energized.

These and other objects of my invention will become more apparent from the following detailed description when read in conjunction with the drawings, wherein:

Fig. 5 is a diagrammatic view of another embodiment of my invention utilizing a bimetallic switch element mounted within a wing housing or blister;

Fig. 6 is a diagrammatic view of still another form of my invention showing a bimetallic switch element mounted within a different type of wing housing; and Fig. 7 is a graphical representation showing the relationship between pressure differential as measured in inches of water and angle of attack in degrees at two different air speeds for a typical wing section.

Figure 1:
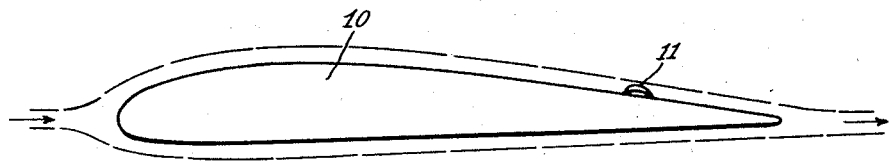
Figure 1 is a diagrammatic view of a section of an airplane wing showing the conditions of air flow over the top and bottom surfaces of the wing during normal flight conditions.
Figure 2:
Fig. 2 is a similar view showing the condition of air flow when the plane is approaching a stall condition.

Referring now to the drawings and, particularly, to Figs. 1 and 2, it will be observed that in Fig. 1, which shows a wing section 10 of an airplane under normal flight conditions, the air flow over the upper and lower surfaces of the wing is smooth; that is, there is no turbulence on either side.

In Fig. 2, which shows the wing positioned at an angle of attack which is approaching a stall condition, it will be observed that the air flow has changed considerably so as to create a turbulence in the vicinity of the trailing edge of the wing and on the upper side thereof. In other words, the air flowing over the bottom of the wing surface curls upwardly about the trailing edge, and the separation point climbs forwardly over the upper surface of the wing, depending upon the angle of attack. This is an incipient stall condition of flight, and use is made of the change in the air-flow conditions in the vicinity of the trailing edge of the wing resulting therefrom to effect the operation of the warning apparatus of my invention.

Figure 3:
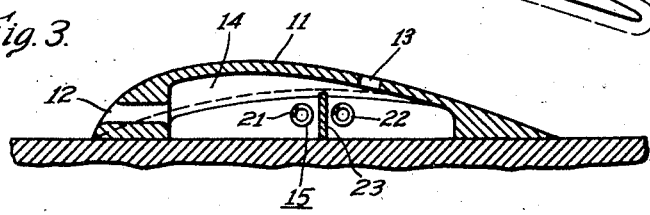
Fig. 3 is a side elevational view in section of the housing or blister shown in Fig. 4 for containing the control elements of the system.
Figure 4:
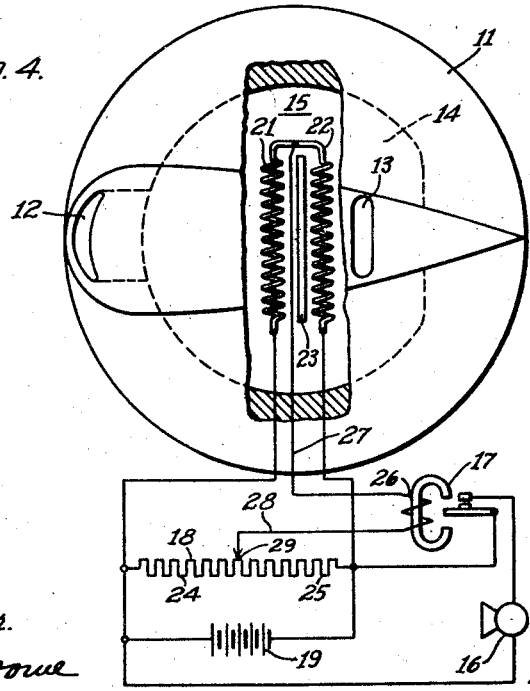
Fig. 4 is a diagrammatic view of one embodiment of my stall warning apparatus showing hot wire anemometer elements mounted in a housing or blister and the cooperating control circuits.

Referring now to Figs. 3 and 4, the numeral 11 indicates one form of a suitable housing or blister for the control element of the system. In this instance, the housing 11 is shown in the form of a spherical wing blister adapted to be mounted upon the upper surface of the wing in the vicinity of the trailing edge in the position as shown in Figs. 1 and 2. This housing is so positioned as to be at the separation point of the air-flow as determined by an incipient stall condition. The distance at which the housing 11 is located from the trailing edge of the wing depends upon the particular wing structure, but the distance is usually found to be on the order of twenty per cent of the wing chord from the trailing edge. The exact distance at which the housing 11 is located for each wing structure of a certain type is best determined by a suitable test.

As shown in Figs. 3 and 4, the housing 11 is provided with a front opening 12 and a rear opening 13 through which air may pass. The housing 11 is of hollow construction so as to provide a compartment 14 for containing the control element or elements of the system.

Referring to Fig. 4, which shows a preferred embodiment of my invention insofar as the electrical elements of the system are concerned, it will be observed that the system comprises, generally, a control element 15 mounted within the housing 11, a signalling device 16, a control relay therefor 17, a resistor 18, and a battery or other source of current 19.

In this instance, the control element is comprised of a pair of hot wire anemometer elements 21 and 22 mounted in side-by-side relation within the compartment 14 and crosswise thereof so as to be subjected to the air flow through the openings 12 and 13. A barrier 23 is positioned between the two anemometer elements, as shown, in order to provide for effecting unequal cooling of these elements by the air stream flowing through the housing.

The signalling device 16 may take any suitable form and may be of an audible or visible type. As shown, it is of the audible type and is operated from current supplied by the battery 19.

In order to provide for controlling the operation of the signalling device 16, the control relay 17, which is preferably of the polarized type, is connected in a bridge circuit comprising the resistor 18 and anemometer elements 21 and 22. In this instance, the anemometer element 21 and the portion 24 of the resistor 18 comprise one side of the bridge circuit, and the anemometer 22 and the portion 25 of the resistor the other side thereof. The operating coil 26 of the relay is connected across the balance point of the bridge circuit by means of conductors 27 and 28. The connection of the conductor 28 to the resistor 18 is made variable in order to provide for balancing or otherwise adjusting the bridge circuit under normal flight conditions.

It will be apparent that the bridge circuit is energized from the battery 19, and that it may be so adjusted or balanced by means of the variable connection 29 so as to provide for retaining the control relay 17 in an open position so long as the anemometer elements 21 and 22 are within a predetermined range of relative temperatures.

It will be apparent that since the anemometer element 21 is positioned in front of or ahead of the anemometer element 22, which is also shielded by the baffle 23, the anemometer element 21 normally operates at a lower temperature than the element 22. This is for the reason that the pressure differential between the openings 12 and 13 in the housing is high enough to provide the necessary flow of air therethrough to maintain this temperature condition of the control element.

It will be understood, however, that under the conditions as illustrated in Fig. 2 when the angle of attack becomes such that a turbulent air condition is created in the region of the housing 11, the pressure differential between the openings 12 and 13 is reduced to such value as to no longer maintain this temperature condition of the control element. In this event, the temperature of the anemometer element 21 increases to a greater extent than the temperature of the element 22 which causes the bridge circuit to become sufficiently unbalanced or otherwise affected to effect the operation of the control relay 17. Upon closure of the control relay, the signalling device 16 is operated to warn the pilot of an incipient stall condition.

A typical condition under which the control relay 17 is closed to operate the signalling device 16 is illustrated in Fig. 7 by the two curves shown therein. It will be observed that in this figure the pressure differential between the openings 12 and 13 in the housing 11 is plotted against the angle of attack in degrees of the wing. The point at which the control relay operates regardless of the speed of the airplane is the zero pressure differential position, as indicated where both the curves come together or approach each other closely at the zero pressure differential position. In the example shown, this occurs at approximately 26° angle of attack. It will be observed that the two curves coincide for only a very short distance in the critical region, and that it is necessary for the warning apparatus to operate within this small range and at a sufficient time in advance of an actual stall condition as to give the pilot an adequate warning.

Referring now to Fig. 5 which shows another embodiment of my invention, the control element 31 in this instance is in the form of a bimetallic switch which functions to directly control the energization of the signalling device 32 from the battery 19'.

The control element 31 comprises a pair of bimetallic members 33 and 34 mounted in parallel relation within the compartment 14 of the housing and crosswise thereof to be subjected to the air flow therethrough. The bimetallic members are anchored at corresponding ends thereof on a suitable mounting block 35, and contact members 36 and 37 are mounted at their opposite ends.

In order to provide for maintaining the contact members 36 and 37 in the open position, a heater element 38 is mounted between the bimetallic members and energized from the battery 19'.

Under normal flight conditions, the air flow through the housing 11 is such as to maintain the contact members in an open position, the bimetallic member 33 being maintained at a lower temperature than the bimetallic member 34 due to the fact that it receives the greater amount of cooling effect from the air passing through the housing.

It will be apparent, however, that as an incipient stall condition occurs, as illustrated in Fig. 2, air flow in the housing is reduced to such extent that the bimetallic members 33 and 34 become heated to such an extent as to effect the closure of contact members 36 and 37 to energize the signalling device 32.

While the control elements 15 and 31 have been shown mounted within a housing in the form of a spherical blister, it is to be understood that these devices may be utilized in other forms of housings or heads so long as such housings or heads provide for an air flow therethrough in accordance with the pressure differential between a pair of spaced openings. In this instance, the housing 11 is shown as having front and rear openings in the form of slots in order to provide an adequate air flow, although it is to be understood that any other suitable kind of openings may be used.

Another form of housing or head is illustrated in Fig. 6 which shows another embodiment of my invention. In this embodiment the housing 41 is in the form of a modified Pitot tube. The housing comprises a base portion 42 and barrel portion 43 which is of hollow construction and provided with a front opening 44 and a plurality of rear openings 45. This housing is adapted to be mounted upon the upper surface of the wing in the same manner as the housing 11, as shown in Figs. 1 and 2.

In this instance, the control element 46 comprises a pair of bimetallic members 47 and 48 provided with contact members 49 and 51 for controlling the operation of the signalling device 32. The bimetallic member 47 is provided with a heater element 52 and the bimetallic member 48 with a heater element 53, both of which are energized from the battery 19.

In order to maintain the contact members 49 and 51 in the open position during normal conditions of flight, a suitable barrier 54 is interposed between the bimetallic members 47 and 48. This barrier functions as a shield for the lower member 48 which causes it to operate at a higher temperature than its cooperating member 47 so long as a sufficient pressure differential exists to cause the necessary amount of air to flow through the head 41.

It will be understood, however, that as soon as an incipient stall condition results, the air flow decreases to such extent that the temperature of the bimetallic member 47 also increases to such extent that the contact members 49 and 51 engage to energize the signalling device 32.

In view of the foregoing description of the various embodiments of my invention illustrated, it will be apparent that they are of such nature as to not be materially affected by changes in ambient temperature and battery or source voltage. With respect to the device of Fig. 4, for example, it will be apparent that since a bridge circuit is utilized the electrical components are affected in the same manner by changes in ambient temperature and battery voltage. Therefore, the balance of the bridge circuit is not disturbed to any material or appreciable degree and the accuracy of the device is not disturbed. The same is true with respect to the embodiments of Figs. 5 and 6 utilizing bimetallic contact elements. Both are affected in the same manner by changes in ambient temperature and battery voltage. Thus it is not necessary to provide temperature compensation or maintain constant battery or source voltage or compensate for changes in battery or source voltages. This simplifies the device or devices as a whole and reduces their cost of manufacture and upkeep. It also provides a more accurate and durable device.

In view of the foregoing description of three specific embodiments of my invention, it will be understood that I have provided stall warning apparatus for use on airplanes which is of simple and economical construction and which may be readily applied to almost any type of wing structure. The devices of my invention are of such nature as to function reliably under all operating conditions and are responsive to change in air-flow conditions over the upper surface of the wing and not to any definite angle of attack as some of the devices of the prior art. They are also of such nature as not to be materially affected by changes in ambient temperature and battery or source voltage. In other words, the devices of my invention function to reliably indicate an incipient stall condition regardless of any changes which have occurred in the airfoil contour due to icing. This results from the fact that these devices function in response to a pressure differential or to air-flow direction instead of in response to some other condition which is not indicative of the actual flight condition as a still is approached.

Since certain changes may be made in the various embodiments of my invention disclosed herein without departing from the principles of the invention, it is to be understood that these embodiments are to be considered as illustrative only and not in a limiting sense.

I claim as my invention:

1. Stall warning indicating apparatus for aircraft comprising, an electrically operated warning device, and electro-thermal control means therefor disposed to be mounted upon the wing surface and controlled by the direction of air-flow over the wing surface as determined by the angle of attack, thereby to effect the operation of the warning device to warn the pilot of an incipient stall condition.

2. Stall warning indicating apparatus for aircraft comprising, an electroresponsive warning device, an energizing circuit therefor, and means for controlling said energizing circuit including thermal control means disposed to be mounted upon the upper wing surface adjacent the trailing edge thereof, said thermal control means comprising a pair of temperature responsive elements controlled by a flow of air as determined by a pressure differential established by the air flow over the upper wing surface in accordance with the angle of attack of the wing structure.

3. Stall warning indicating apparatus for aircraft comprising, a warning device, a relay for controlling the operation thereof, and electro-thermal means responsive to variations of pressure differential therein resulting from the direction of air flow over the wing surface for controlling said relay in accordance with the angle of attack of the wing.

4. Stall warning apparatus for an airplane comprising, an electrically operated signalling device, and control means for the signalling device including a device adapted to be positioned upon the upper surface of a wing of the plane intermediate the leading and trailing edges thereof in the zone of air turbulence resulting from the angle of attack of the wing, said device being thermally responsive to air-flow direction over the wing surface to operate the signalling device to warn the pilot of an incipient stall condition.

5. Stall warning apparatus for an airplane comprising, an electrically operated signalling device, and control means for controlling the energization of the signalling device, said control means including a housing adapted to be mounted upon the upper surface of a wing of the plane and having inlet and outlet openings so positioned as to establish a pressure differential therebetween and provide an air flow therethrough which varies with the angle of attack of the wing and an electro-thermal control device mounted therein to be responsive to the variations of air flow through the housing as determined by the angle of attack of the wing.

6. Stall warning indicating apparatus for an airplane comprising, an electrically operated signalling device, a relay operable to control the energization thereof, and means including a pair of hot wire anemometer elements mounted upon the surface of a wing adjacent the trailing edge thereof for controlling said relay in response to the air flow direction over the wing, said anemometer elements being differentially cooled responsive to air flow direction as determined by the angle of attack of the wing and functioning to effect the operation of the relay and signalling device as the plane approaches a stalling condition.

7. Stall warning indicating apparatus for an airplane comprising, an electrically operated signalling device, a relay operable to control the energization thereof, means including a pair of hot wire anemometer elements mounted upon the upper surface of a wing to be responsive to the direction of air flow thereover, and a bridge circuit including said anemometer elements for controlling the operation of said relay, said anemometer elements functioning to unbalance the bridge circuit to effect operation of the relay in response to a change in their relative temperatures resulting from air-flow direction dependent upon the angle of attack of the wing.

8. Stall warning indicating apparatus for an airplane comprising, an electrically operated signalling device, and control means for the signalling device, said control means including a housing adapted to be mounted upon the upper surface of a wing of the plane adjacent the trailing edge thereof in a position to be subjected to the direction of air flow thereat, said housing having spaced apart front and rear openings between which a pressure differential is established by the air flow thereover, a pair of hot wire anemometer elements mounted within the housing between said front and rear openings to be subjected to the air flow therethrough, said elements being so positioned that one is in shielding relation to the other, and means including a relay responsive to the change in the relative resistances of said anemometer elements as determined by the air-flow direction through said housing resulting from variations of the pressure differential between said openings in accordance with the angle of attack of the wing, said relay functioning to energize the signalling device to warn the pilot of an incipient stall condition.

9. Stall warning indicating apparatus for use on an airplane to indicate an incipient stall condition comprising, a signalling device adapted to be mounted on the plane, a polarized relay for controlling the energization of the signalling device from a source of current on the plane, a bridge circuit including a pair of hot wire anemometer elements for controlling the operation of the relay, a housing adapted to be mounted upon the upper surface of a wing adjacent the trailing edge thereof and having front and rear openings, said anemometer elements being mounted within said housing between the openings thereof to be subjected to air flow therethrough, and a baffle plate disposed in said housing between said elements and in shielding relation to one of said elements, whereby the relative resistances of the anemometer elements as determined by the direction of air flow through the housing which is controlled by the angle of attack of the wing of the plane upon which the housing is mounted.

10. Stall warning indicating apparatus for an airplane comprising, an electrically operated signalling device, a relay operable to control the energization of the signalling device, a housing member adapted to be mounted upon the upper surface of a wing of the plane and having front and rear openings to provide an air flow therethrough, a pair of hot wire anemometer elements mounted within said housing with a baffle therebetween in shielding relation to one of said elements so as to maintain said anemometer elements at different temperatures at such times as the angle of attack of the wing is not sufficient to cause a near stall condition and to cause the temperature difference between said elements to be reduced as a stalling condition is approached, and a bridge circuit including as two opposed legs thereof the anemometer elements for controlling the operation of the relay, whereby the signalling device is operated to warn the pilot of an incipient stall condition in response to a change in pressure differential within the housing between said openings as determined by the angle of attack of the wing.

11. Stall warning or indicating apparatus for airplanes comprising, a hollow housing member adapted to be attached to the upper wing surface of the plane in a position to be subjected to a change in air-flow conditions dependent upon the angle of attack of the wing and having front and rear openings therein, an electroresponsive signalling device, and means for controlling the operation of the signalling device including electro-thermal control means mounted within the housing to be responsive to a variation of air flow through the housing as determined by the pressure differential between the front and rear openings thereof, thereby to effect the operation of the signalling device to warn the pilot of an incipient stall condition.

12. Stall warning or indicating apparatus for airplanes comprising, a hollow housing member adapted to be attached to the upper wing surface of the plane in a position to be subjected to a change in air-flow conditions dependent upon the angle of attack of the wing and having front and rear openings therein, an electroresponsive signalling device, and thermal switch means mounted within the housing for controlling the operation of the signalling device, said switch means being responsive to the direction of air flow through the housing as determined by variations in the pressure differential between said openings resulting from changes in the angle of attack of the wing, thereby to warn the pilot of an incipient stall condition of the plane.

13. Stall warning or indicating apparatus for airplanes comprising, a hollow housing member adapted to be attached to the upper wing surface of the plane in a position to be subjected to a change in air-flow conditions dependent upon the angle of attack of the wing and having front and rear openings therein, an electroresponsive signalling device, and switch means mounted within the housing between the front and rear openings thereof for controlling the energization of the signalling device, said switch means including a pair of bimetallic contact elements and a heater element disposed therebetween so positioned that one of said elements is cooled to a greater degree than the other under normal flight conditions and operable in accordance with the direction of air flow through said housing as determined by variations in the pressure differential between said openings resulting from changes in the angle of attack of the wing to warn the pilot of an incipient stall condition.

14. Stall warning or indicating apparatus for airplanes comprising, a hollow housing member adapted to be attached to the upper wing surface of the plane in a position to be subjected to a change in air-flow conditions dependent upon the angle of attack of the wing and having front and rear openings therein between which a pressure differential is established causing a flow of air through the housing member, an electroresponsive signalling device, and switch means mounted within the housing for controlling the energization of the signalling device, said switch means including a pair of bimetallic strips mounted in spaced parallel relation within the housing between the front and rear openings thereof with one strip in shielding relation to the other and carrying opposed contacts at their free ends and a heater element disposed between said strips, whereby the relative position of said strips is dependent upon the direction of air flow through the housing as determined by the pressure differential between the openings and engagement of the contacts occurs at an angle of attack of the wing indicative of an incipient stall condition of the plane.

15. Stall warning or indicating apparatus for airplanes comprising, a hollow housing member adapted to be attached to the upper wing surface of the plane in a position to be subjected to a change in air-flow conditions dependent upon the angle of attack of the wing and having front and rear openings therein between which a pressure differential is established causing a flow of air through the housing, an electroresponsive signalling device, and thermal switch means mounted within the housing for controlling the signalling device, said switch means including a pair of spaced bimetallic contact elements positioned crosswise of the housing between the openings therein one in front of the other so that one is partially shielded from air flow by the other and a heater element positioned therebetween, whereby said contact elements are rendered responsive to air-flow direction through the housing as determined by the pressure differential between the openings dependent upon the angle of attack of the wing of the plane and function to effect the operation of the signalling device as the plane approaches a stall condition.

FRANK W. GODSEY, Jr.

REFERENCES CITED

The following references are of record in the file of this patent:

UNITED STATES PATENTS

| Number | Name | Date |
| --- | --- | --- |
| 2,214,181 | Rylsky | Sept. 10, 1940 |
| 2,269,019 | Hall | Jan. 6, 1942 |
| 2,287,497 | Rockefeller | June 23, 1942 |
| 2,356,847 | Holthe | Aug. 29, 1944 |

FOREIGN PATENTS

| Number | Country | Date |
| --- | --- | --- |
| 354,381 | Great Britain | Aug. 10, 1931 |